United States Patent [19]
Worwetz

[11] 3,902,695
[45] Sept. 2, 1975

[54] VALVE FOR CRYOGENIC SERVICE

[75] Inventor: Harold A. Worwetz, Sag Harbor, N.Y.

[73] Assignee: The United States of America as represented by the United States Energy Research and Development Administration, Washington, D.C.

[22] Filed: Dec. 13, 1973

[21] Appl. No.: 424,257

[52] U.S. Cl. ................. 251/61.2; 251/61; 251/333; 251/334

[51] Int. Cl.[2] ...................... F16K 1/34; F16K 51/02

[58] Field of Search ............ 251/333, 334, 61, 61.2, 251/61.4

[56] References Cited

UNITED STATES PATENTS

| | | | |
|---|---|---|---|
| 668,012 | 2/1901 | Locke | 251/333 |
| 1,585,732 | 5/1926 | Otto et al. | 251/61.4 |
| 2,297,872 | 10/1942 | Carter et al. | 251/61 X |
| 2,414,908 | 1/1947 | Smith | 251/333 |
| 3,185,438 | 5/1965 | Smirra | 251/334 |
| 3,805,835 | 4/1974 | Jansen | 251/61 X |

FOREIGN PATENTS OR APPLICATIONS

| | | | |
|---|---|---|---|
| 1,196,263 | 5/1959 | France | 251/333 |

*Primary Examiner*—Arnold Rosenthal
*Attorney, Agent, or Firm*—John A. Horan; Leonard Belkin

[57] ABSTRACT

A valve for use with a liquefied gas at cryogenic temperatures in which a pair of joined knife edges are bellows controlled to contact an indium alloy seat in an annular slot when flow is to be stopped. The sealing alloy may be renewed by heating in situ.

1 Claim, 3 Drawing Figures

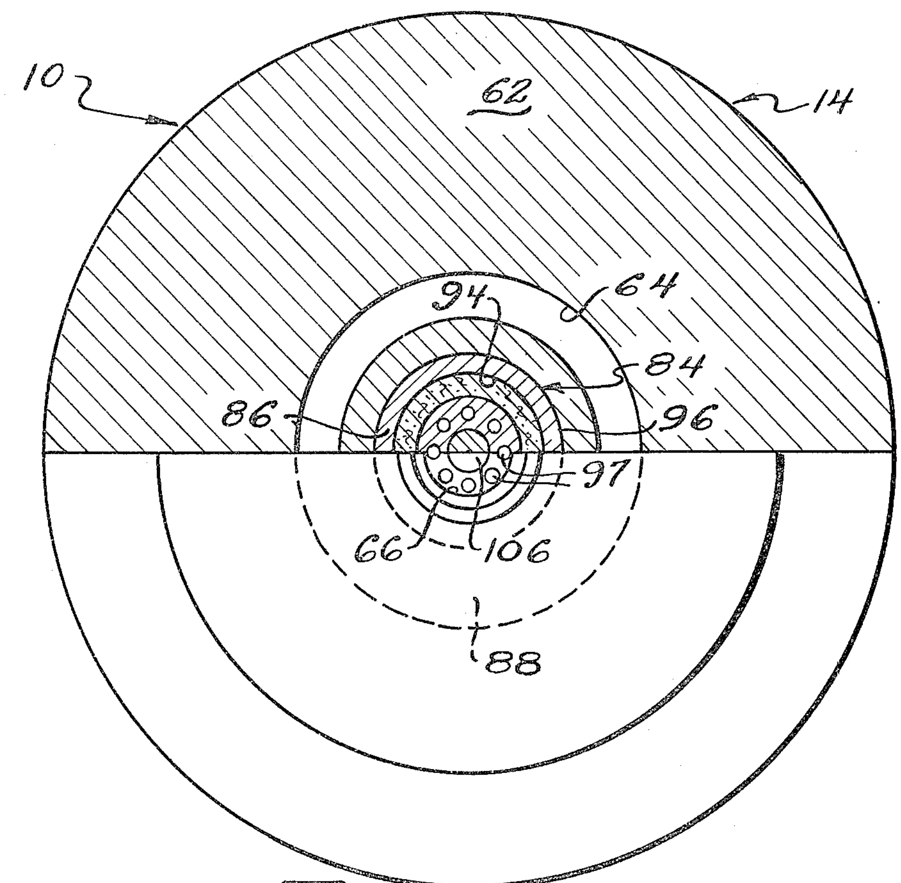
Fig-2
Fig-3
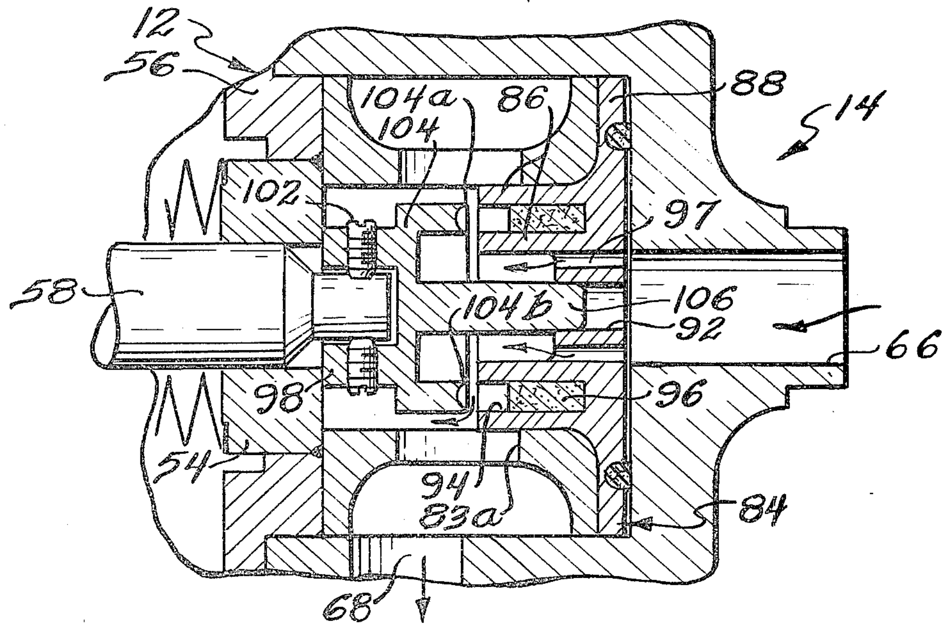

VALVE FOR CRYOGENIC SERVICE

BACKGROUND OF THE INVENTION

The invention described herein was made in the course of, or under a contract with the U.S. Atomic Energy Commission.

The use of valves to control fluid flow at cryogenic conditions, such as temperatures substantially below zero degrees centigrade, and fluids such as liquid hydrogen, involve problems of a technical nature which are not found at ambient conditions or at higher temperatures.

An example of this is the attempt to employ valves incorporating a knife edge and a plastic seat to control liquid hydrogen flow, and to prevent leakage when the valve is closed. It has been found that in order to obtain adequate sealing it is necessary to employ tremendous pressures. Further, the plastic seats must be replaced frequently due to the effects of high pressure contact which is required, and when the valves are solenoid operated, in view of the explosive characteristics of hydrogen, elaborate so-called anti-explosion designs are necessary.

These problems as well as others which are associated with valves to be operated at such low temperatures require elaborate and expensive designs to overcome them.

BRIEF SUMMARY OF THE INVENTION

The present invention overcomes many of the aforementioned problems by providing a valve suitable for cryogenic use which is reliable, simple in construction, and long-lasting.

In accordance with a preferred embodiment of this invention there is provided such a valve in which there is an annular groove formed by parallel side walls filled partially with a solid material deformable at the low temperatures of operation, an axially moveable annularly shaped member closely fitting within said groove having a pair of inner and outer knife edges to slide along the inner surfaces of the walls forming the groove, and a bellows operated means to selectively move the knife edges into contact with the deformable material or to retract the member completely out of the groove. Fluid flow, in either direction, extends from the space enclosed by the groove annulus part of the knife edges to the space outside of the groove annulus.

An important feature of the invention is that large pressures are not required to close the valve completely against leakage. Further, if the deformable material has a relatively low melting temperature it can be renewed by heating and melting in situ, followed by cooling.

It is thus a principal object of this invention to provide a valve for cryogenic applications capable of convenient and long lasting use in the control of fluid flow.

Other advantages and objects of this invention will hereinafter become obvious from the following description of a preferred embodiment of this invention.

BRIEF DESCRIPTION OF THE DRAWINGS

FIG. 2 is a view along 2—2 of the device shown in FIG. 1; and

FIG. 3 is a view of a portion of the arrangement shown in FIG. 1 with the valve in an open position.

DESCRIPTION OF THE PREFERRED EMBODIMENT

Figure 1:
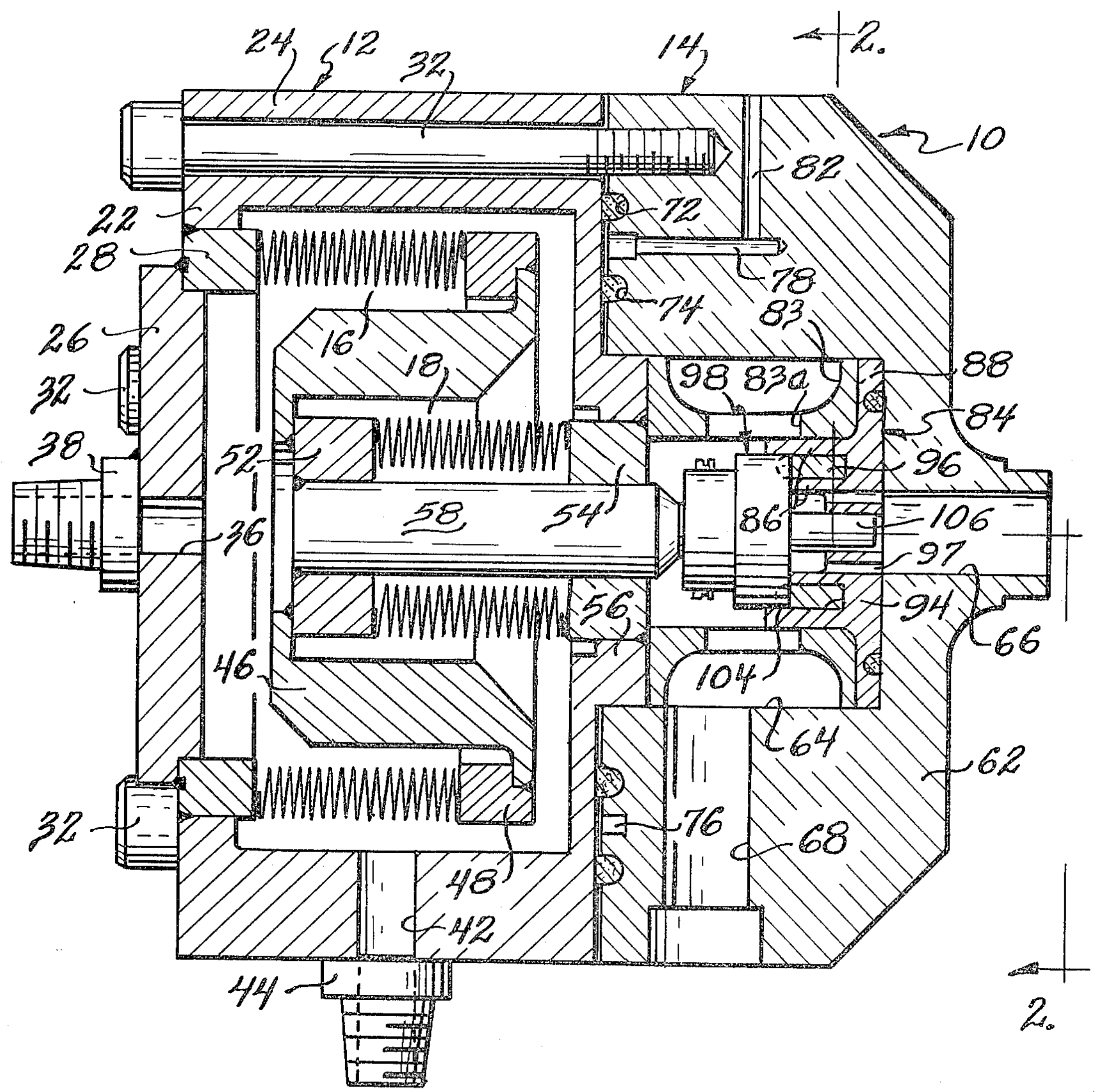
FIG. 1 is an elevation view in section of a preferred embodiment in a closed position.

Referring to the drawings, there is shown valve assembly 10 consisting of an actuator subassembly 12 and liquid flow subassembly 14.

Subassembly 12 has an outer bellows 16 and an inner bellows 18. Outer bellows 16 is supported at the outer end by housing 22 which is made from housing ring 24 designed to mate at one end with subassembly 14 as illustrated and at the other end to support an end plate 26 and a bellows retainer ring 28 connected to the outer end of outer bellows 16. Several screws such as 32 shown mount housing 22 on subassembly 14. End plate 26 has an opening 36 with a fixture 38 attached whereas ring 24 has a side opening 42 with a fixture 44 attached thereto also. The purpose of these openings will be evident below.

Within housing 22 is a floating member 46 with an outer bellows retainer ring 48 joined to the inner end of bellows 16 and an inner bellows retainer ring 52 joined to the outer end of inner bellows 18 as illustrated. The inner end of bellows 18 is connected to bellows retainer ring 54 which is rigidly connected to an end piece 56 from housing ring 24. End piece 56 it will be seen fits into subassembly 14. A slidable stem 58 inside of bellows 18 is connected at the outer end to bellows retainer ring 52 and hence floating member 46 while the inner or right end of plunger 58 extends into subassembly 14.

It is readily seen that if gas under pressure is delivered through opening 36 into housing 22 while opening 42 is relieved of a source of pressure, floating member 46 and stem 58 will move inwardly, or to the right. Conversely, if opening 36 is released from gas pressure and a high pressure source is exposed to opening 42, then floating member 46 and plunger 58 will move outwardly, or to the left.

Subassembly 14 consists of a solid housing 62 with a central opening or cavity 64 facing subassembly 12 and a passageway 66 through the closed side as shown. There is also a side port 68 as shown through housing 62. It will also be seen that there is provided a pair of annular grooves 72 and 74 on the surface facing subassembly 12 filled with suitable sealant and a groove 76 therebetween connected by leakage ports 78 and 82 to the outside of housing 62. Any leakage past the seal 74 will thus be drained from assembly 10.

Within cavity 64 there is an annular U-shaped member 83 with opening 83a and on the right a seat retainer assembly 84 which consists of cylindrical portions 86 and a disc portion 88 having an opening 92 therethrough. An annular slot 94 formed between cylindrical portions 86 faces to the left as shown and is partially filled with a sealant or valve seat 96 of solid material deformable at the temperature of operation made from a suitable alloy as will be further described below. Surrounding opening 92 are annularly arranged openings or passageways 97.

A stem adapter 98 mounted on the right end of stem 58 by set screws 102 has an annular knife extension 104 extending to the right into slot 94 and an axial guide extension 106 which at the right extremity fits into inner opening 92 to keep the knife edges properly alligned.

Annular knife extension 104 forms at its extremity a pair of annular knife edges 104_a_ and 104_b_ the outer surfaces of which ride smoothly against the side walls of slot 94 and the inner surfaces are joined as illustrated by a concave shape. It is readily apparent from the description that when stem adapter 98 is urged to the right, knife edges 104*a* and 104*b* will embed themselves into sealant 96, crimping the latter, and provide excellent sealing.

The material selected for valve seat or sealant 96 should be deformable, by which is meant herein, solid at the temperature of use but yet sufficiently ductile or pliable to obtain the sealing action required. It has been found that a 98% indium - 2% silver alloy having a relatively low melting temperature is suitable for this purpose. An additional advantage of such an alloy, if one with a relatively low melting temperature is selected, is that the seal can be renewed by melting sealant 96 in situ to permit it to resume its initial shape. The low melting temperature makes this possible without damaging the remaining apparatus.

In the operation of the apparatus just described, fixtures 38 and 44 are connected by hoses (not shown) to a suitable source or sources of pressure with valves and the like so that bellows 16 and 18 may be actuated to move adapter 98 to the right to close the valve and terminate flow as shown in FIG. 1, or move adapter 98 to the left to permit flow as shown in FIG. 3. Flow of the liquid through valve assembly 10 may be in either direction. The liquid may enter passageway 66 as shown by the arrow, passing through openings 97, outwardly between knife extension 104 and cylindrical portions 86 when separated (as in FIG. 3) and out through openings 83a and passageway 68. Flow may be reversed if desired.

It is thus seen that there has been provided a relatively simple yet effective and reliable arrangement for valving the flow of a liquefied gas at extremely low or cryogenic temperatures. While a preferred embodiment has been described it is understood that many modifications are possible without departing from the principles of this invention as defined in the appended claims.

I claim:

1. A valve for use in cryogenic service comprising:

a. valve body means for carrying fluid flow;

b. means within said body means forming an annular groove having a pair of parallel side walls;

c. solid deformable sealant material filling the closed bottom of said groove;

d. means for forming a solid member closely fitting the space between said side walls shaped into a pair of annularly spaced knife edges facing said material, the outside surfaces of said knife edges being shaped to ride on the interior surfaces of said side walls, said solid member and said groove with said side walls being slideable with respect to each other between a position where said knife edges are embedded in said material preventing flow through the interior of said groove forming means and a position where said knife edges are retracted from said groove permitting fluid flow past said means forming the groove in said body means; and e. means for selectively urging said knife edges into contact with said sealant material for closing said body means to fluid flow or retracting said knife edges to permit flow therethrough, said urging means comprising gas actuated bellows means for actuating said knife edges, said bellows means consisting of a floating member connected to said solid member and a pair of bellows connected to said floating member for actuating the latter in response to gas pressures in opposite directions.

* * * * *